(12) United States Patent
Geiselhart et al.

(10) Patent No.: US 12,450,237 B2
(45) Date of Patent: Oct. 21, 2025

(54) CONTROLLING ACCESS TO SAMPLED DATABASES

(71) Applicant: INTERNATIONAL BUSINESS MACHINES CORPORATION, Armonk, NY (US)

(72) Inventors: Reinhold Geiselhart, Rottenburg-Ergenzingen (DE); Juergen Schimpf, Schoenaich (DE); Rene Blath, Weil im Schoenbuch (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/469,219

(22) Filed: Sep. 18, 2023

(65) Prior Publication Data

US 2025/0094426 A1   Mar. 20, 2025

(51) Int. Cl.
*G06F 16/20* (2019.01)
*G06F 16/23* (2019.01)
*G06F 16/2455* (2019.01)
*G06F 16/2458* (2019.01)
*G06F 16/27* (2019.01)

(52) U.S. Cl.
CPC .... *G06F 16/24564* (2019.01); *G06F 16/2365* (2019.01); *G06F 16/2462* (2019.01); *G06F 16/273* (2019.01)

(58) Field of Classification Search
CPC ............ G06G 16/24564; G06F 16/273; G06F 16/2365; G06F 16/2462
See application file for complete search history.

(56) References Cited

U.S. PATENT DOCUMENTS

| 7,668,818 | B2* | 2/2010 | Hou ..................... G06F 16/2452 707/705 |
| 9,177,017 | B2* | 11/2015 | De Smet ............ G06F 16/2452 |
| 9,223,827 | B2* | 12/2015 | Hou ..................... G06F 16/2452 |
| 9,558,230 | B2* | 1/2017 | Hollifield ........... G06F 16/2365 |

(Continued)

FOREIGN PATENT DOCUMENTS

| CN | 111797137 B | 3/2022 |
| CN | 111190897 B | 4/2023 |

(Continued)

OTHER PUBLICATIONS

IBM, "Db2 Analytics Accelerator for z/OS," https://www.ibm.com/products/db2-analytics-accelerator, downloaded from internet Jul. 27, 2023, pp. 1-5.

(Continued)

*Primary Examiner* — Daniel A Kuddus
(74) *Attorney, Agent, or Firm* — Teddi Maranzano, Esq.; Blanche E. Schiller, Esq.; Heslin Rothenberg Farley & Mesiti P.C.

(57) ABSTRACT

A request to query sampled data of a database is obtained. Based on the request, a determination is made as to whether access to the sampled data of the database is to be allowed. To determine whether access to the sampled data of the database is to be allowed, a query domain defined for the query is checked with a data domain defined for the sampled data. Based on determining that access is to be allowed, access to the sampled data, via the query, is allowed.

20 Claims, 10 Drawing Sheets

(56) References Cited

U.S. PATENT DOCUMENTS

| | | | | |
|---|---|---|---|---|
| 2007/0233651 A1* | 10/2007 | Deshpande | ....... | G06F 16/24556 |
| 2007/0299836 A1* | 12/2007 | Hou | ................... | G06F 16/2452 |
| 2009/0094216 A1* | 4/2009 | Hou | ................... | G06F 16/2452 |
| 2012/0079464 A1* | 3/2012 | De Smet | ............. | G06F 16/2452 |
| | | | | 717/143 |
| 2014/0379667 A1* | 12/2014 | Hollifield | ............ | G06F 16/2365 |
| | | | | 707/687 |
| 2018/0253653 A1* | 9/2018 | Ozcan | ................... | G06F 16/367 |
| 2018/0286519 A1* | 10/2018 | Peyerl | ................... | G16H 40/20 |
| 2020/0293564 A1* | 9/2020 | Reh | ......................... | G06N 3/08 |
| 2021/0374348 A1* | 12/2021 | Dasgupta | ............... | G06N 3/044 |
| 2022/0027399 A1* | 1/2022 | Reh | ................... | G06Q 10/0633 |

FOREIGN PATENT DOCUMENTS

| | | | |
|---|---|---|---|
| CN | 116028699 A | | 4/2023 |
| CN | 115827930 B | | 5/2023 |
| EP | 3084675 | * | 10/2016 |
| EP | 3084675 B1 | * | 10/2016 |

OTHER PUBLICATIONS

Geiselhart, Reinhold et al., "Conditional Replication of Data," U.S. Appl. No. 17/806,963, filed Jun. 15, 2023, 43 pages.

IBM, "IBM InfoSphereData Replication," https://www.ibm.com/support/knowledgecenter/en/SSTRGZ_11.4.0/com.ibm.idr.frontend.doc/pv_welcome.html, Mar. 17, 2023 & Jul. 31, 2023, 5 pages.

IBM, "Db2 Data Gate on Cloud Pak for Data," https://www.ibm.com/support/producthub/icpdata/docs/content/SSQNUZ_latest/svc-welcome/dg.html, Aug. 30, 2023, 4 pages.

* cited by examiner

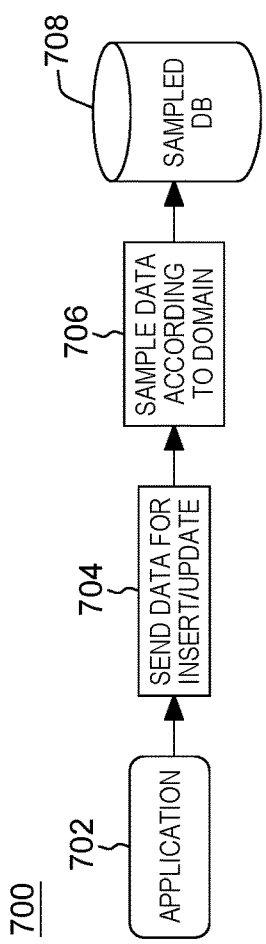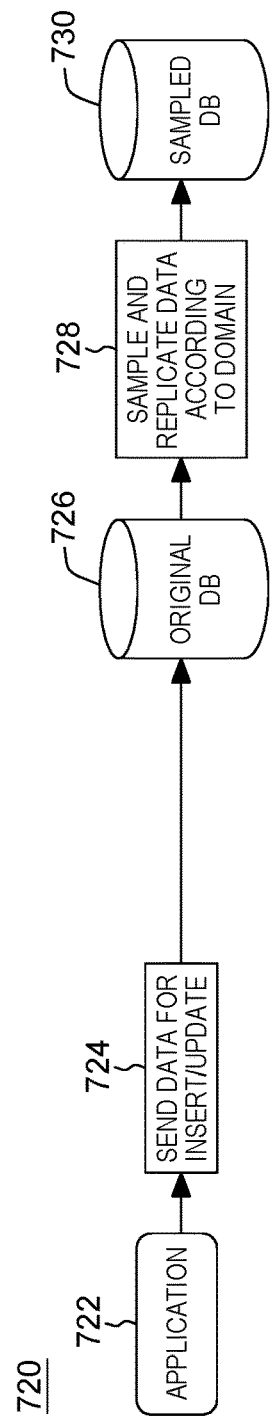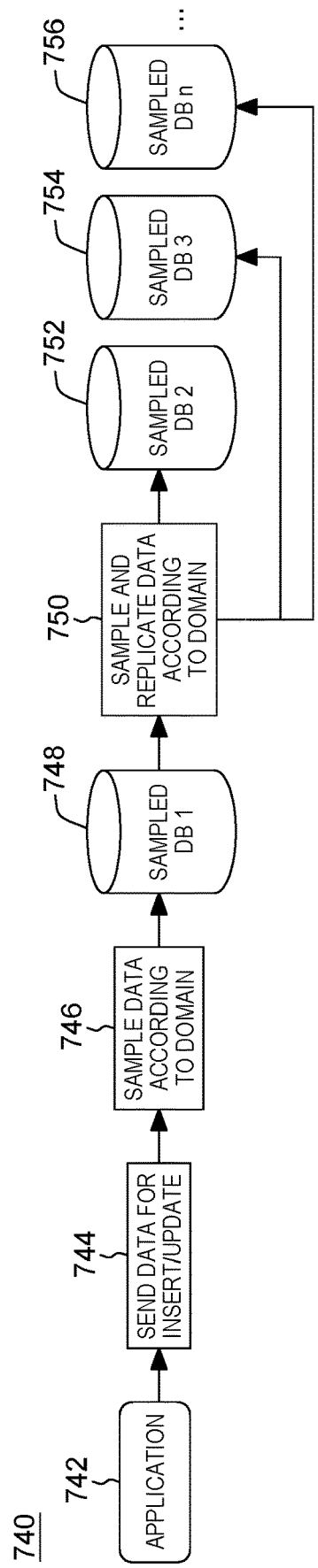

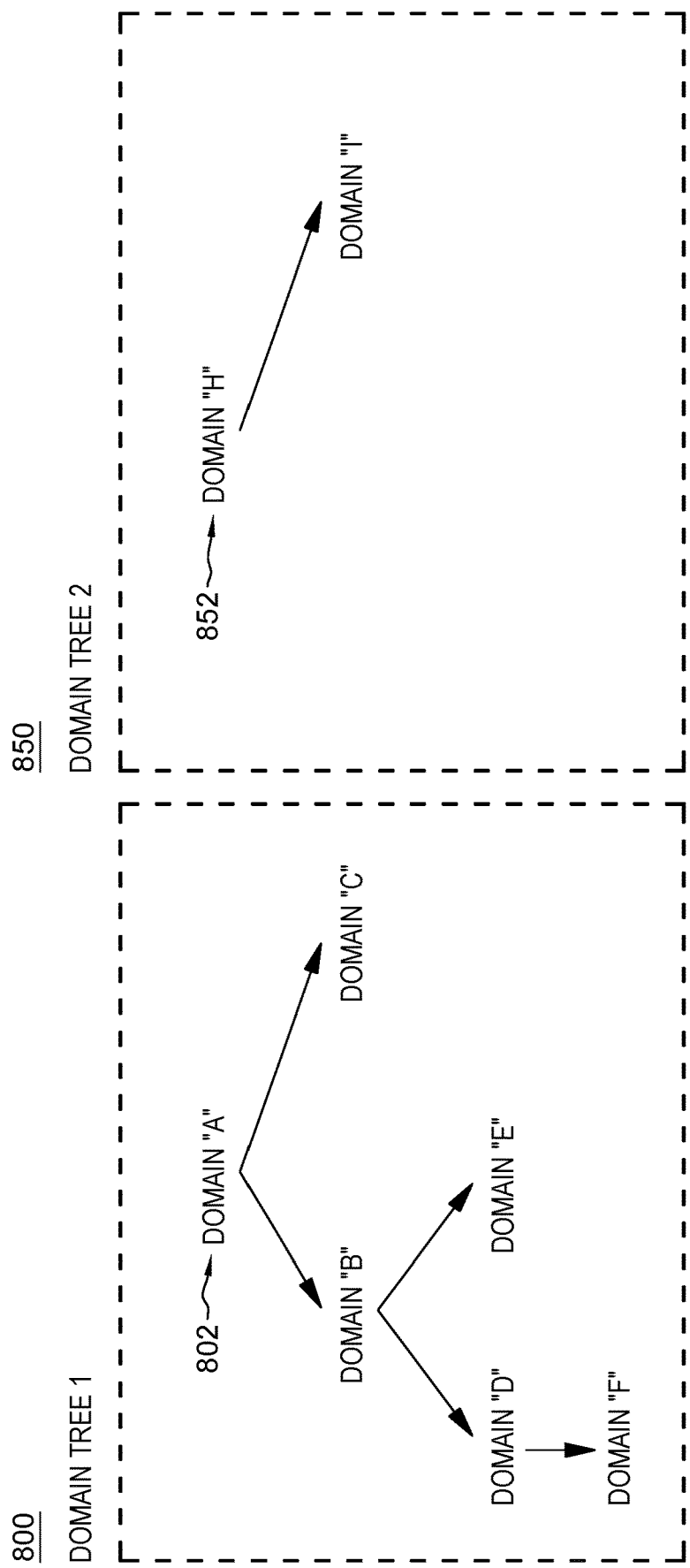

CONTROLLING ACCESS TO SAMPLED DATABASES

BACKGROUND

One or more aspects relate, in general, to facilitating processing within a computing environment, and in particular, to facilitating access to sampled databases of the computing environment.

With innumerable instances of highly connected computer systems throughout the world, various forms of information and data are exchanged between interconnected systems. Information/data is stored in multiple copies at multiple locations, resulting in additional information/data being sent around a network. A suitable data replication and data storing approach is used to keep the cost of multiple copies at a reasonable level. With the exchange of information and data, data consistency is to be preserved. That is, in a global interconnected world of information, it is assumed and anticipated that data is to be consistent, regardless of where and in which computer system it resides.

The exchange of information/data poses another challenge, data latency. Data latency refers to how long it takes until data is in synchronization again after it is changed at one place, and, in this context, how costly it is to keep data latency at a minimum. In one aspect, in an attempt to address data latency, an approach is taken to intentionally not replicate each and every data change. In this approach, data sampling is applied when information/data is to be replicated between different locations. The focus is on minimizing costs of data replication, while, at the same time, assuring that a refresh of the data stays in expected boundaries.

When data is sampled, queries of the sampled data may provide unexpected results.

SUMMARY

Shortcomings of the prior art are overcome, and additional advantages are provided through the provision of a computer program product for facilitating processing within a computing environment. The computer program product includes one or more computer readable storage media and program instructions collectively stored on the one or more computer readable storage media. The program instructions collectively stored include program instructions to obtain a request to query sampled data of a database, and program instructions to determine, based on the request, whether access to the sampled data of the database is to be allowed. The program instructions to determine whether access to the sampled data of the database is to be allowed include program instructions to check a query domain defined for the query with a data domain defined for the sampled data. The program instructions collectively stored further include program instructions to allow access to the sampled data, via the query, based on determining that access is to be allowed.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIGS. 7A-7C depict various examples of sampling data according to one or more domains, in accordance with one or more aspects of the present disclosure;

FIGS. 8A-8B depict examples of domain trees, in accordance with one or more aspects of the present disclosure;

DETAILED DESCRIPTION

Figure 1:
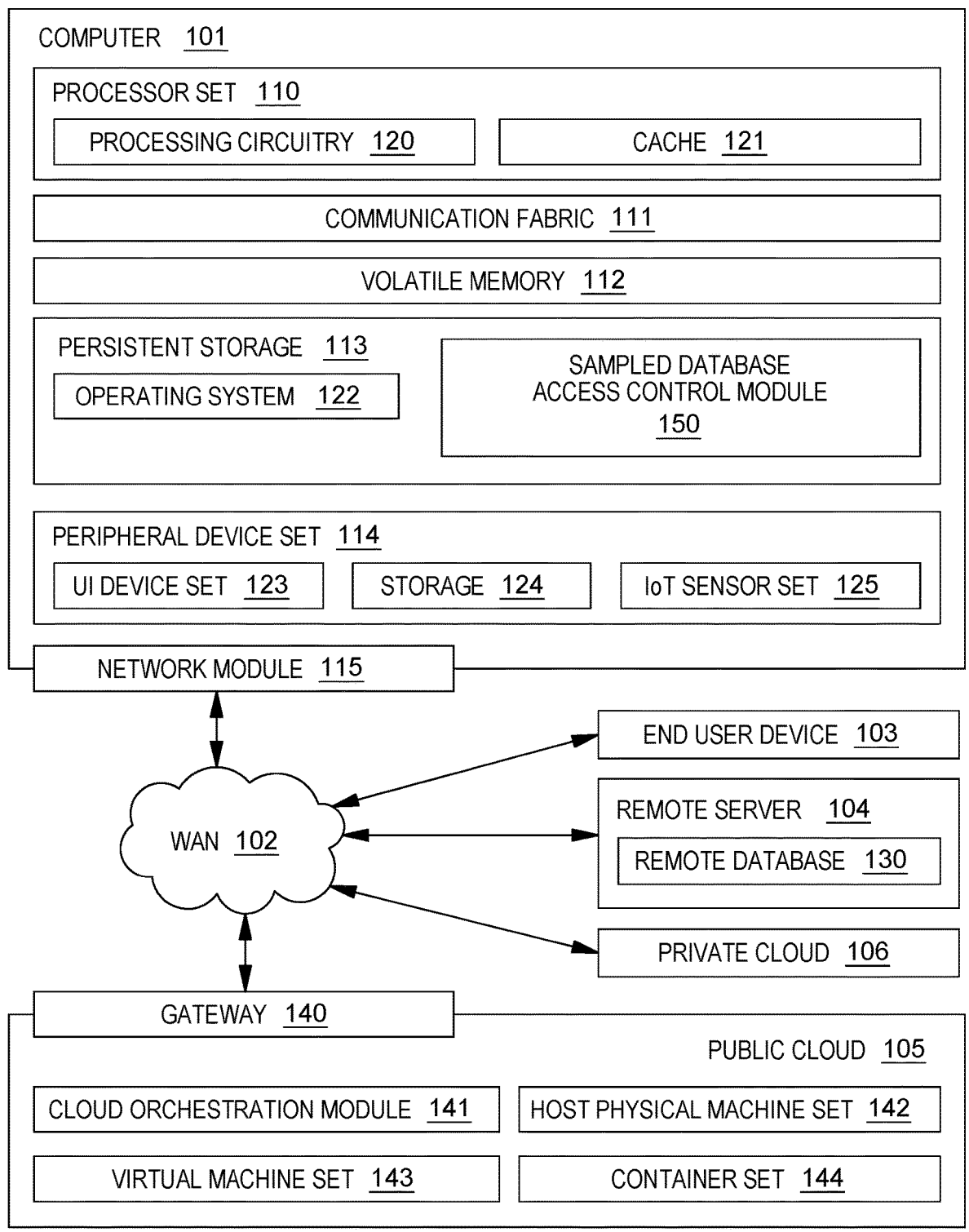
FIG. 1 depicts one example of a computing environment to incorporate, perform and/or use one or more aspects of the present disclosure.

In accordance with one or more aspects of the present disclosure, a capability is provided to facilitate processing within a computing environment. In one aspect, the capability includes controlling access to sampled data of one or more databases. In one example, the one or more databases are sampled databases. A sampled database is, for instance, a database that intentionally includes less data than the original data. For instance, if the data is changing rapidly, it may not include all of the changes but instead, a sampling of the changes.

One or more aspects of the present disclosure are incorporated in, performed and/or used by a computing environment. As examples, the computing environment may be of various architectures and of various types, including, but not limited to: personal computing, client-server, distributed, virtual, emulated, partitioned, non-partitioned, cloud-based, quantum, grid, time-sharing, cluster, peer-to-peer, wearable, mobile, having one node or multiple nodes, having one processor or multiple processors, and/or any other type of environment and/or configuration, etc. that is capable of executing a process (or multiple processes) that, e.g., control access to sampled data and/or performs one or more other aspects of the present disclosure. Aspects of the present disclosure are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present disclosure is described with reference to FIG. 1. In one example, a computing environment 100 contains an example of an environment for the execution of at least some of the computer code involved in performing the inventive methods, such as sampled database access control code or module 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present disclosure. Other examples are possible. For instance, in one or more embodiments, one or more of the components/modules of FIG. 1 are not included in the computing environment and/or are not used for one or more aspects of the present disclosure. Further, in one or more embodiments, additional and/or other components/modules may be used. Other variations are possible.

Figure 2:
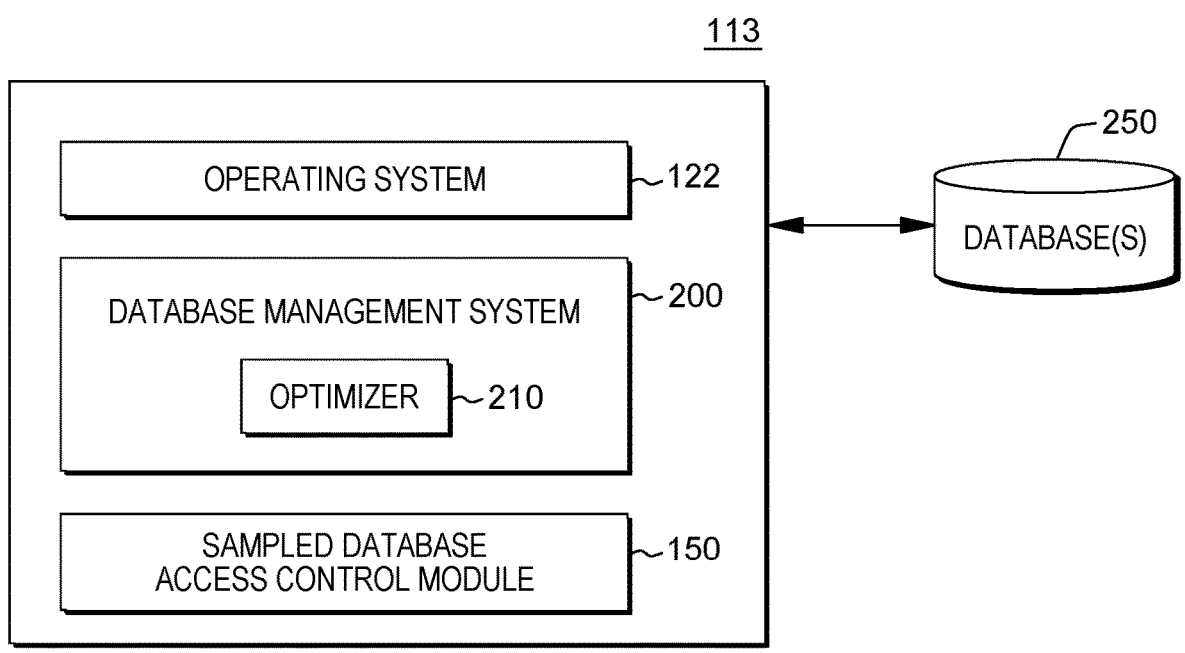
FIG. 2 depicts one example of a database management system to incorporate, perform and/or use one or more aspects of the present disclosure.

Further details relating to one or more components/modules of FIG. 1 used in accordance with one or more aspects of the present disclosure are described herein. For example, as shown in FIG. 1 and further described with reference to FIG. 2, persistent storage 113 includes an operating system, such as operating system 122. Running on operating system 122 may be a database management system, such as a database management system 200, that manages, for instance, storage, retrieval and/or access to data of one or more databases, such as databases 250.

In one example, the database management system (e.g., database management system 200) includes an optimizer, such as optimizer 210, that facilitates access to the data of the databases, including querying the data. The optimizer may be any component of the database management system to manage access to the data. The optimizer uses, in one or more examples, one or more sub-modules of sampled database access control module 150, as described herein.

In accordance with one or more aspects of the present disclosure, one or more of the databases (e.g., at least one database of databases 250) are sampled databases in which at least some of the data in the database is a sampling of the data (referred to herein as sampled data). In sampling, the database management system (e.g., database management system 200) intentionally discards data, based, for instance, on one or more algorithms and/or one or more mathematical models. This is to reduce the system load in storing and/or replicating data, to provide better performance, reduce storage resources and/or reduce latency.

Figure 3A:
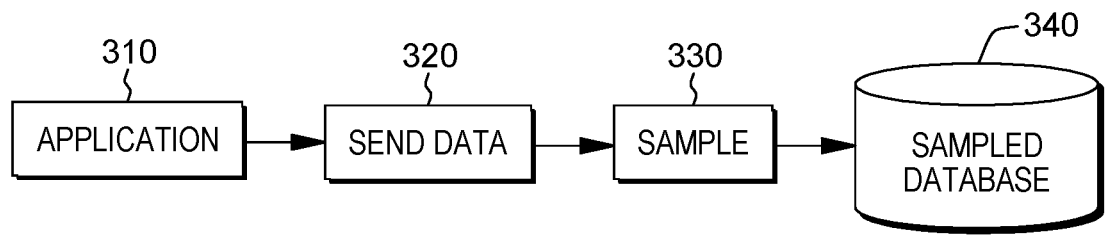
FIG. 3A depicts one example of sampling data, in accordance with one or more aspects of the present disclosure.

In one example, sampling may be used for stand-alone databases. For instance, referring to FIG. 3A, an application 310 sends 320 data to be inserted into a database. Prior to being inserted, sampling 330 is performed to determine whether the data is to be stored/updated into the database 340 or intentionally left out.

Figure 3B:
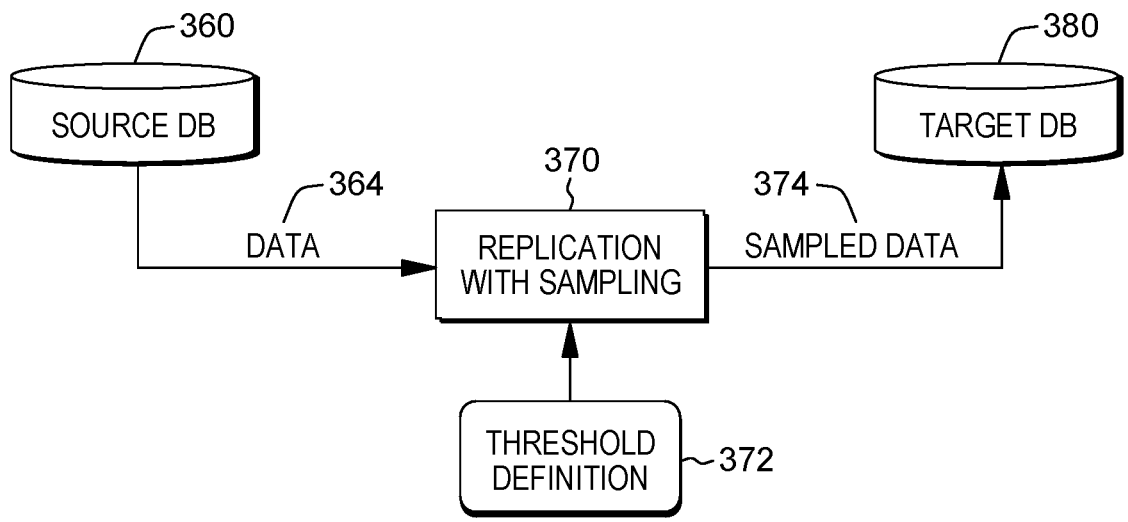
FIG. 3B depicts another example of sampling data, in accordance with one or more aspects of the present disclosure.

In another example, sampling may be used in replicating data from a source database to a target database, as described with reference to FIG. 3B. As shown, a source database 360 has data 364 to be replicated. However, in accordance with one or more aspects, sampling 370 is to be performed on the data to determine whether it is to be replicated. Sampling uses, for instance, a threshold definition 372, to determine whether the data is to be sampled and provided to a target database 380. If, for instance, the data, based on the threshold definition, is not to be replicated, then it is intentionally discarded. However, if it is determined that it should be replicated, then the sampled data 374 is stored in target database 380. Based on the sampling, intentionally, sampled data in the target database may no longer match corresponding data of the source database.

Sampling of data in a database system means intentionally discarding information (based, e.g., on mathematical models and/or algorithms/techniques). As examples, mathematical models and/or algorithms/techniques are used to determine whether to update a specific piece of data or instead to skip the update. These models/algorithms/techniques may be very complex, since, for instance, sampling is adapted to the characteristics and behavior of the data, and this is traded against the costs of a data refresh.

One example in which sampling may be performed applies to sensor data, such as a temperature sensor (or other sensor), e.g., on the internet that delivers a new value every x time, such as every 100 milliseconds (or other defined times), but most often with only little to no changes in value. In such an example (or other examples where, for instance, the data is being updated frequently but may not require saving each update), a sampling model is created by, e.g., a subject matter expert (SME) and/or via artificial intelligence in which a sampling model is trained/re-trained, to map the sensor characteristics and time-wise behavior in an optimal way to only selected information (e.g., information deemed crucial and/or desired to be updated). For instance, the model may specify the following:

Sensor model temperature sensor—Sensor data will be replicated or updated when the following conditions are met, as an example:
Sensor value >"absolute value1" AND
<="absolute value2" AND
abs(slope(dv/dt)) higher than 15% AND
standard deviation of last 25 data-points>0.3.

While this temperature sampling model may be optimized to decide specifically on this type of data when a change in the temperature value bears enough information to be replicated to the target system (and discard changes which are not of interest) under certain assumptions, it is understood that this complexity cannot be analyzed by all system components (including queries/applications) permanently and instantly, to decide whether a useful operation based on the sampled data is still advisable.

As indicated, when sampling occurs, the sampled data no longer matches the original data. In the example of a replicated database, as depicted in FIG. 3B, sampled data on the target site no longer completely matches the corresponding data on the source site, intentionally. With intended or intentional data loss, unlike unintended data loss due to, e.g., a network disruption, latency, etc. in which the data is still available, it is not just a matter of a predictable time to refresh "old" data, as the data has already been discarded by the sampling algorithm. Further, it is not known in which timeframe the next update will happen, as this depends on the behavior of the data.

Since not all data is replicated, and therefore, parts of it are older as compared to the original data, querying data at a target site may produce different results compared to running the query at the source site. For some queries/applications, this may be tolerable to a certain extent, but not for others. The challenge is to prevent queries/applications from accessing sampled data if they cannot tolerate the possible differences compared to data which is not sampled. Queries/applications usually do not expect old data, and are therefore, not aware of data sampling and the consequences of such, nor do they have any notion of sampling thresholds or sampling models which decide about how old and outdated at least parts of the accessed data could become.

Thus, in one or more aspects, queries/applications are to be informed about the sampling of data, and what this could mean to them in terms of information loss and whether this is tolerable for a specific query/application. Due to the variety of use-cases, the complexity of sampling algorithms and the fact that sampling could even be changed dynamically, due to changing system parameters, such as workload or resource constraints, this is not an easy task. In one example, the knowledge about, e.g., which data in a database system is sampled, at which location, in which way, and/or which queries/applications are allowed to work with which sampled data is to be available in the whole database system at various places and in a consistent way, even open to changes at any point in time.

In accordance with one or more aspects, this complex information is abstracted and encapsulated into what is referred to herein as domains. Domains may serve as a denomination or currency throughout the whole system for processing and making decisions.

As used herein, a domain describes, for instance, the field of application in which sampled data of a particular type is used by queries/applications on one hand, and how it is sampled and processed throughout the system on the other hand. In this way it allows for quick decision making anywhere in the system of whether a specific query/application can work with a specific sampled data item, at any point in time.

Figure 4:
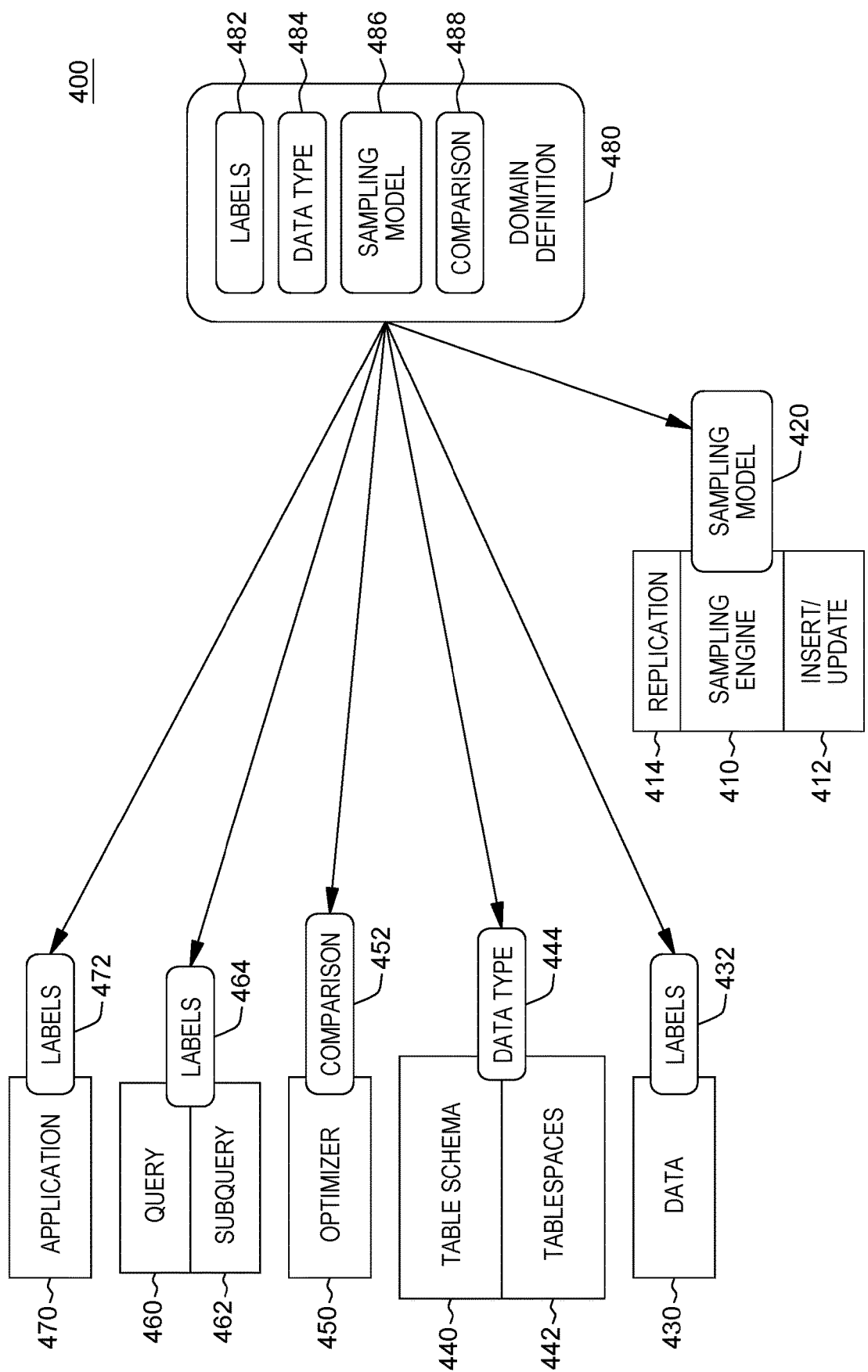
FIG. 4 depicts one example of an architectural overview of domains used in accordance with one or more aspects of the present disclosure.

One example of providing a domain definition is described with reference to FIG. 4. Depicted in FIG. 4 is one example of an architectural overview 400 of typical database system components, along with an indication of which information is to be identified for which component, in accordance with one or more aspects.

In one example, a sampling engine 410 (e.g., of a database management system, such as database management system 200) decides whether a new value of a specific data item (belonging to a specific domain) will be inserted/updated in the database (standalone scenario) or will be replicated from a source to a target database (replicated databases scenario). The sampling engine makes this determination based on, e.g., sampling model 420 and/or algorithms/techniques defined for data of that domain. The data 430 which has been sampled according to the sampling model 420 and/or algorithms/techniques of a specific domain is to have a label 432 for identification.

As examples, data may be labeled with a label based on one or more of: latency, freshness, sampling error, field of application, accuracy, precision of the data, and/or sampling model or algorithm/technique with which the data has been inserted/updated in a database or replicated from a source database to a target database. In one example, each of the latency, freshness, sampling error, precision, etc. is an indication of the tolerance for each. For instance, for sampling error, the label may be an indication that a very small or no sampling error is tolerated, or it may specify a particular sampling error range. In other examples, it may indicate a greater tolerance for sampling errors. Similar indications may be provided for latency, freshness, precision, etc. Many variations are possible.

The labeling may include assigning a tag or label to the data indicating the label and/or storing the data in a particular table, partition, column or cell dedicated to a sampled data label. Many variations are possible.

Further, in one or more examples, table schema 440 and table spaces 442 are to support a new data type 444, e.g., Sampled Data. This indicates that the data stored in an entry of the table is sampled data. Further, an optimizer 450 (or other component of a database system that decides about access) is to have instructions available to determine whether queries/applications are allowed to work with specific sampled data, or to block access (e.g., via comparisons 452). Queries 460/subqueries 462 are to identify themselves to which domain they belong (e.g., via labels 464), in order to allow the optimizer to decide about access. Similarly, labels 472 are to be specified for applications 470.

In one or more embodiments, a query, subquery and/or application may have a same label and/or different labels. The label, whether for data, queries, subqueries and/or applications, is associated with a domain. It is, for instance, the name of a domain or is associated with a domain via a mapping of labels to domains, as examples. In one example, a query, one or more subqueries of the query and an application that includes the query/subqueries may be associated with the same domain. In another example, a particular query, for instance, may wish to have, e.g., a smaller (or larger) sampling error than, e.g., the application and, therefore is assigned a different domain than the application. Similarly, a subquery may have a different domain than the query and/or application. Many variations/examples are possible.

A domain definition 480 is provided that contains elements of labels 482, data types 484, sampling model 486 and/or comparison instructions 488 to be created, maintained and kept available in the database system. As examples, for the temperature sensor example, a domain definition named or labeled "Weather-Alert" may be defined and assigned a sampling algorithm specification with a rather high sampling effect (i.e., not many data values are stored in the database, most of the data points are discarded). Thus, the "absolute value1" is set rather low and "absolute value2" rather high. The same is true for slope (i.e., change rate per second), which is to be rather high and standard deviation from past sensor values are also rather high to cause the new data points to be stored. In contrast, one could create a domain with name or label "Medical-Fever-Indication" and assign a sampling algorithm specification with a rather low sampling effect. Here, even a slight deviation of the temperature data points from the normal body temperature would cause these data points to be stored/replicated in the database. So, the items of a domain definition include, for instance, the name (to indicate the usage), the sampling algorithm (to define how many data points can be discarded) and/or the position in the tree. Many other examples/variations are possible.

In one or more aspects, the database management system (e.g., database management system 200 (FIG. 2)) uses one or more modules to facilitate access to the sampled data. For instance, database management system 200 uses sampled database access control module 150 to, e.g., provide labels, data types and one or more domain definitions.

Figure 5:
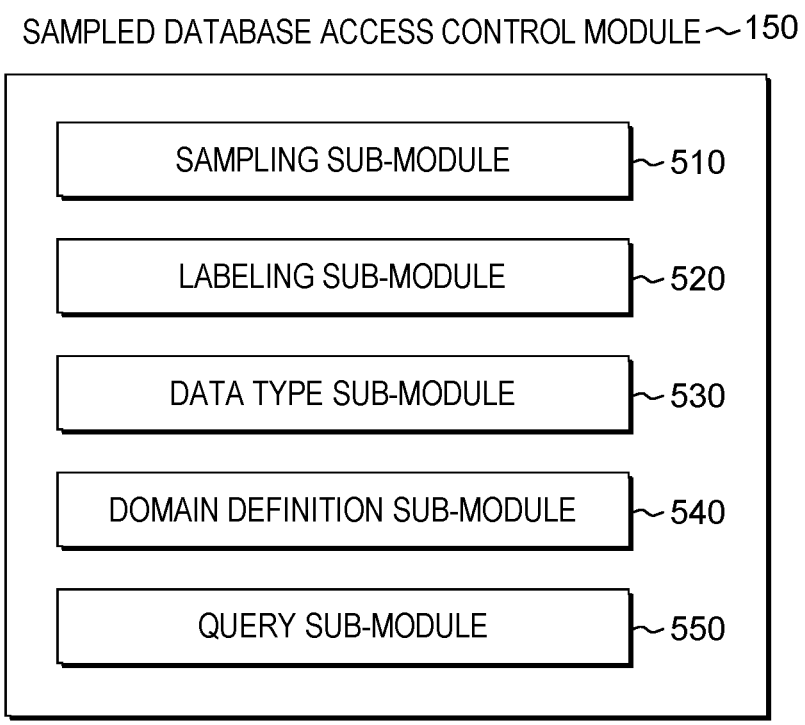
FIG. 5 depicts one example of sub-modules of a sampled database access control module of FIG. 1, in accordance with one or more aspects of the present disclosure.

In one or more aspects, referring to FIG. 5, a sampled database access control module (e.g., sampled database access control module 150) includes, in one example, various sub-modules to be used to facilitate and/or control access to sampled databases and/or to perform tasks relating thereto. The sub-modules are, e.g., computer readable program code (e.g., instructions) in computer readable media, e.g., storage (persistent storage 113, cache 121, storage 124, other storage, as examples). Although, as an example, sampled database access control module 150 is depicted in FIG. 1 in persistent storage 113, one or more sub-modules may be in other storage, etc. Many variations are possible.

The computer readable media may be part of one or more computer program products and the computer readable program code may be executed by and/or using one or more devices (e.g., one or more computers, such as computer(s) 101; one or more servers, such as remote server(s) 104; one or more end user devices, such as end user device(s) 103; one or more processors or nodes, such as processor(s) or node(s) of processor set 110; processing circuitry, such as processing circuitry 120 of processor set 110; and/or other devices, etc.). Additional and/or other computers, servers, end user devices, processors, nodes, processing circuitry, network devices and/or other devices may be used to execute one or more of the sub-modules and/or portions thereof. Many examples are possible.

Example sub-modules of sampled database access control module 150 include, for instance, a sampling sub-module 510 to provide sampled data, such as sampled data for specific domains; a labeling sub-module 520 to provide labels for selected items of information, including, for instance, data, queries/subqueries, and/or applications; a data type sub-module 530 to provide a data type to support sampled data; a domain definition sub-module 540 to provide domain definitions defining domains used in controlling access to sampled data; and a query sub-module 550 to query the sampled data based on the domains. Additional, fewer and/or other sub-modules may be used to control access to sampled data. Other variations are possible. Although various sub-modules are described, a sampled database access control module, such as sampled database access control module 150, may include additional, fewer and/or different sub-modules. A particular sub-module may include additional code, including code of other sub-modules, less code, and/or different code. Further, additional and/or other modules may be used to facilitate access to sampled data and/or perform related tasks. Many variations are possible.

One or more of the sub-modules are used, as described herein, to provide labels for data and other information, define domains using the labels, use the domains in sampling data and/or provide access to the sampled data based on the domains.

When introducing sampling in a traditional database, complexity is brought into the system. It is to be anticipated that the system, as a whole, will behave in a different way by the intended loss of information. This includes the way to process sampled data throughout the system, as well as how to deal with applications/queries when these are most probably getting different results when operating on sampled data, as opposed to working on original data as before.

With sampling, in accordance with one or more aspects, modifications are made in several components and areas, including the way in which the components work together. The basic challenge is to bring information about rather complex sampling models/algorithms to these areas in the database system, including database clients/applications—in a way, which allows the whole system to make sound decisions about how to deal with the loss of information and how to continue working as expected. In other words, the challenge is to reduce a rather high complex situation to an abstract level, on which database aspects/components can work. This is the goal of domains. The configuration data relating to domains is to be available for all involved components at any time.

Figure 6:
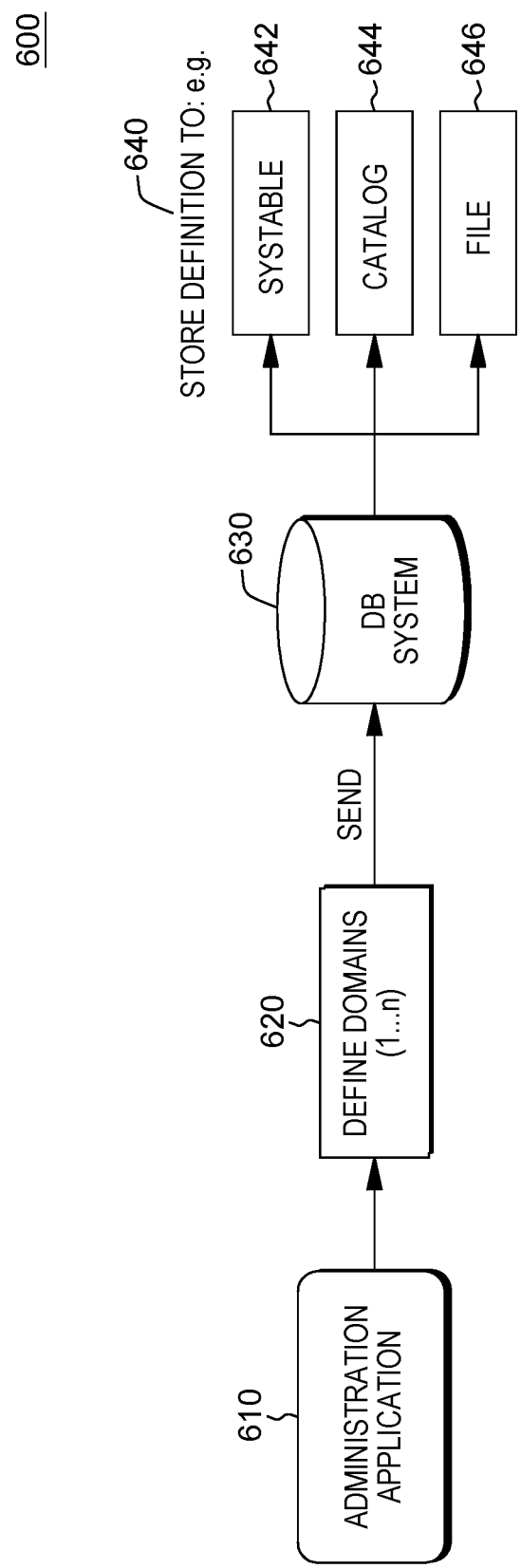
FIG. 6 depicts one example of defining and storing domain definitions, in accordance with one or more aspects of the present disclosure.

One example of how a system may administer definitions of domains and several options of where in the system domain definition data may be stored is described with reference to FIG. 6. In one example, an administration process (e.g., an administration process 600) is implemented using one or more of the sub-modules (e.g., one or more of sub-module 520-540) and is executed by a computing device (e.g., computer (e.g., computer 101, other computer, etc.), a server (e.g., server 104, other server, etc.), an end user device (e.g., end user device 103), a processor, node and/or processing circuitry, etc. (e.g., of processor set 110 or other processor sets), and/or one or more other computing devices, etc.). Although example devices, computers, servers, end user devices, processors, nodes, processing circuitry and/or computing devices are provided, additional, fewer and/or other computers, servers, end user devices, processors, nodes, processing circuitry and/or computing devices may be used for administering domain definitions and/or other processing. Various options are possible.

In one example, administration process 600 (e.g., also referred to as process 600) may use one or more administration applications 610 to define one or more domains 620. For instance, one or more domains are defined, as described herein, and process 600 sends the defined domains 620 to a database system 630 (e.g., database management system 200). Database system 630 stores the domain definitions 620 in one or more locations to enable various components of the database system (e.g., database management system 200) to access the domain definitions. As examples, the domain definitions are stored in one or more of at least one system table (e.g., systable) 642, at least one catalog 644 and/or at least one file 646. Other possibilities exist. The domain definitions may be used, for instance, in sampling of the data, as well as determining whether selected sampled data is to be accessed by selected applications/queries.

As indicated, the sampling of data may occur when entering the data for the first time into a database system, during replication from a primary (source) database to one or more secondary (target) databases, or any combination thereof.

For instance, FIG. 7A depicts a standalone database (without replication) where the data is sampled upon entering the database system for the first time. In this example, in a sampling process 700, an application 702 sends 704 data for an insert/update towards the database system. Process 700 samples 706 the data according to at least one domain and enters the sampled data into sampled database 708. For instance, a sampling process determines whether a new value of a specific data item belonging to a specific domain is to be inserted/updated in the database. This is determined based on, for instance, a sampling model and/or algorithms/techniques defined for data of that domain.

FIG. 7B depicts a replicated database with source and target databases where the data is sampled before it is replicated to the target database, i.e., the source database contains the original data. In this example, in a sampling process 720, an application 722 sends 724 data for an insert/update in an original database 726 (e.g., a source database) of a database system. Process 720 samples and replicates 728 the data according to at least one domain and enters the sampled data into sampled database 730. For instance, a sampling process determines whether a new value of a specific data item belonging to a specific domain is to be replicated from the source database to the target database. This is determined based on, for instance, a sampling model and/or algorithms/techniques defined for data of that domain.

FIG. 7C depicts a combination of sampling of data during first entry into the database system and later during replication to one or more secondary databases. In this example, in a sampling process 740, an application 742 sends 744 data for an insert/update towards the database system. Process 740 samples 746 the data according to at least one domain and enters the sampled data into a sampled database 748. Further, in one example, process 740 samples and replicates 750 the data according to at least one domain and enters the sampled data into one or more of sampled databases 752, 754 and 756.

The sampled data in a sampled database (e.g., sampled database 708, 730, 748, 752, 754, 756 and/or other sampled databases) is available for queries by one or more applications. However, in accordance with one or more aspects, access to the sampled data in the sampled databases is controlled and, in one aspect, is based on domains of the requesting application and/or query and the sampled data.

In accordance with one or more aspects, based on an application requesting access to selected sampled data (e.g., via a query), a selected component of the database system (e.g., an optimizer, such as optimizer 450) determines whether the access should be allowed. This decision is based, for instance, on the sampling model and the algorithms by which the specific data has been sampled on one hand-which results in a specific maximum sampling error—and requirements of the specific query/application and their ability to tolerate the sampling errors of the data on the other hand. In other words, the database optimizer is to be provided instructions about how to compare domains with each other.

One form of comparison is equality, in which the optimizer checks whether the domain of the query/application is equal to the domain of the sampled data which the query/application wants to access. Since the concept of domains, in one or more aspects, is based on the postulate that the sampling models and algorithms are tailored to the requirements of queries/applications of the same domain, this comparison between two equal domains results in access is allowed. A more complicated question is what to do if the domains on both sides (queries/application and data) are not equal. Here there could be a situation where two different domains are compatible, i.e., the requirements of queries/application of a different domain are still satisfied by data belonging to another domain. To work with different domains, relationships between the domains are to be developed and defined and mapped to a set of instructions for the database optimizer to do a reasonable comparison between different domains. It is expected that in some cases access could be allowed even when queries/applications and data belong to different domains.

Thus, in accordance with one or more aspects, domains are organized in one or more separate trees, i.e., uni-directed acyclic graphs, in which domains are connected by exactly one path. Examples of domain trees are depicted in FIGS. 8A-8B.

In one example, referring to FIG. 8A, a Domain Tree 1 800 includes, for instance, Domains "A"-"F" 802, and referring to FIG. 8B, a Domain Tree 2 850 includes Domains "H" and "I" 852. Between both domain trees of the example there is no connection. The position and path connections of domains in the trees are defined by, e.g., subject matter experts (and/or via artificial intelligence trained/re-trained models) based on the sampling errors resulting by the domain specific sampling model and/or algorithms. This is because each domain has its own definition of sampling models and algorithms/techniques which result in specific sampling errors of data.

In one example, at the top (or root) of a tree (in the example of FIG. 8A, Domain "A" in Domain Tree 1), there is the smallest sampling error. That is, in one example, the sampling error of the top-level domain (e.g., Domain "A" or Domain "H" in FIG. 8B) is close to, or even equal to, the original data, i.e., no sampling at all. With each lower tree-level in the domain tree, the sampling error increases. In the example above, the sampling error of Domain "B" is higher than that of Domain "A". In another example, tree node Domain "B" has two children: Domain "D" and Domain "E". Here a subject matter expert (or artificial intelligence trained/re-trained models) may decide to modify the sampling model and algorithms of Domain "B" in two separate aspects, resulting in two different types of sampling errors which then form Domain "D" and Domain "E". So, the general rule, in one example, is that a particular domain in a domain tree has exactly one parent (this is the direction in which the sampling error decreases) and can have none to several children (this is the direction in which the sampling error increases, with several children representing higher sampling errors in different aspects).

With separate, disconnected domain trees (in the example above, Domain Tree 1 and Domain Tree 2), there is no path to be found, therefore it is assumed no compatibility exists between domains which are organized in separate, disconnected domain trees. In summary, in one example: for comparing domains and to decide which queries/applications are allowed to access which sampled data, the database optimizer is to traverse through the domain tree. If an "upstream" path connection (e.g., from a lower level domain up to a higher level domain; towards the root of the tree) between the domain of the queries/application and the domain of the sampled data exists, then access is allowed. If there is any "downstream" path connection in between (i.e., between the domain of the query/application and the domain of the data which is intended to be accessed), then no access is allowed. The same is true for separate, disconnected trees: no access is allowed.

In the examples shown in FIGS. 8A-8B, two separate uni-directed acyclic graphs are configured (Domain Tree 1 and Domain Tree 2). In an example regarding domain compatibility evaluation, assume that a query/application of Domain F is to access sampled data of Domain A. The database optimizer, or any component of the database system determining whether access is allowed, proceeds according to an example process. For instance, as described herein, if domain equality is given, then access is allowed.

If domains of queries/application and sampled data are not equal, then the domain tree is to be examined. In one example, the procedure starts with the domain of the query/application and then traverses upstream, i.e., read the (single) parent domain from the domain tree configuration and check whether both are equal. If equality is given, then access is allowed. If equality is not given, then the process is repeated with the next parent domain in the domain tree. If the data domain is found before the top-domain level is reached, or it is the top-level domain, then the optimizer allows access. If, in another example, the domain of the sampled data which is to be accessed is not found (for example as shown in FIG. 8A: Domain E, which is not in the upstream path of query/application Domain F), then access is not granted. Same with a query/application domain in Domain Tree 1 and a data domain in Domain Tree 2. Since there is no (upstream) path connection, access is not allowed, since it is assumed that sampling errors cannot be compared with queries/application requirements.

Figure 9:
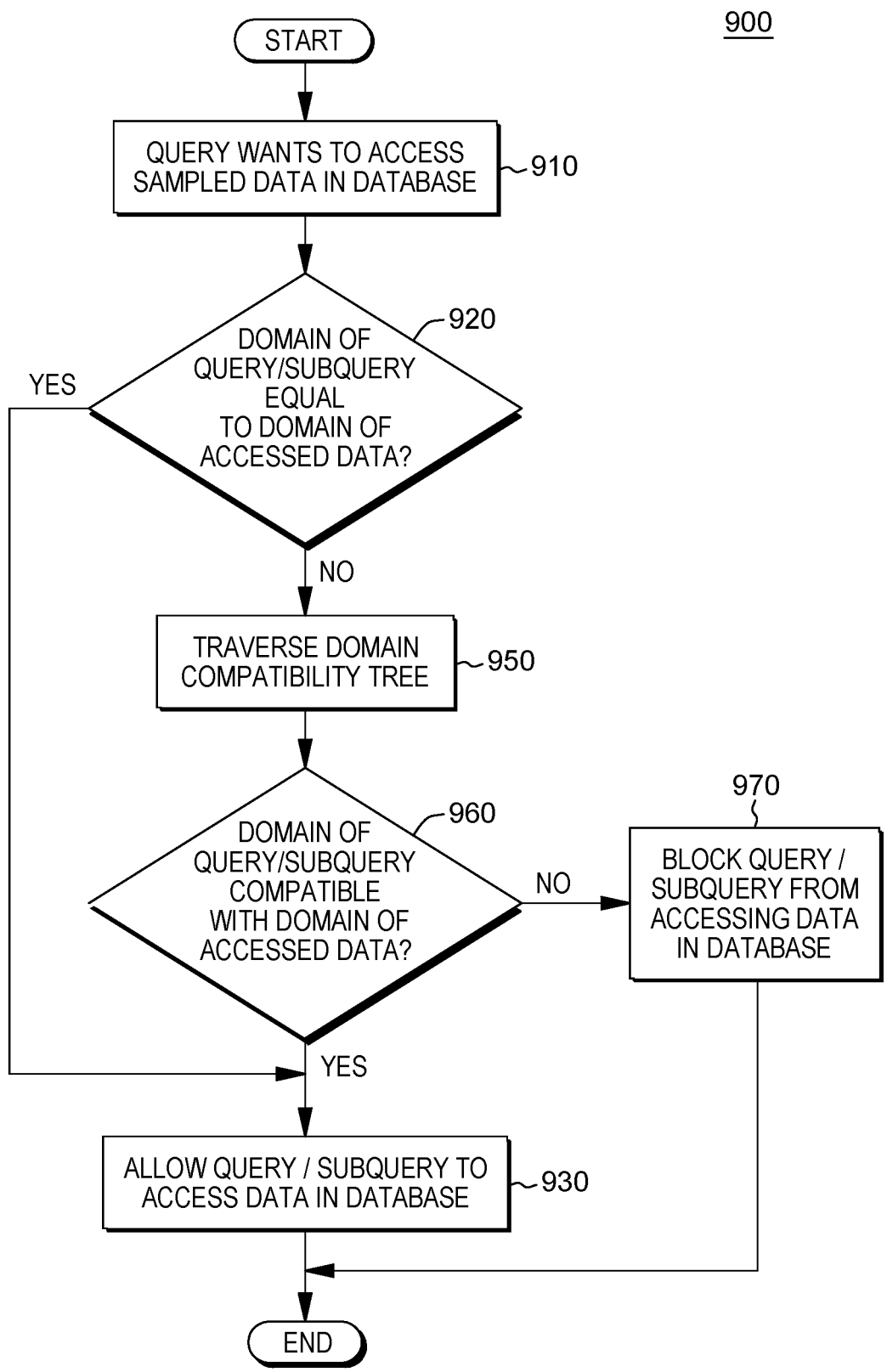
FIG. 9 depicts one example of controlling access to sampled data of a database, in accordance with one or more aspects of the present disclosure.

One example of a process of controlling access is described with reference to FIG. 9. Referring to FIG. 9, in one example, an access control process 900 is implemented using one or more of the sub-modules (e.g., sub-module 550) and is executed by a computing device (e.g., computer (e.g., computer 101, other computer, etc.), a server (e.g., server 104, other server, etc.), an end user device (e.g., end user device 103), a processor, node and/or processing circuitry, etc. (e.g., of processor set 110 or other processor sets), and/or one or more other computing devices, etc.). Although example devices, computers, servers, end user devices, processors, nodes, processing circuitry and/or computing devices are provided, additional, fewer and/or other computers, servers, end user devices, processors, nodes, processing circuitry and/or computing devices may be used for the access control process and/or other processing. Various options are possible.

In one example, referring to FIG. 9, an access control process 900 (also referred to as process 900) determines 910 (e.g., via a data type and/or label) that a query (or subquery, etc.) is requesting access to sampled data of a database. Process 900 determines 920, for instance, whether a domain of the query/subquery (depending on which is requesting) is equal to the domain of the data to be accessed. If the domains are equal, then process 900 allows 930 the query/subquery to access the data (e.g., the sampled data) in the database. However, if the domains are not equal, then process 900 traverses 950 a domain tree (e.g., also referred to as a domain compatibility tree). In other examples, predefined relationships other than equal may be used.

During traversal, at each node level, process 900 determines 960 whether a domain of the query/subquery is compatible with a domain of the data to be accessed. If the domains are compatible at one of the node levels, process 900 allows 930 the query/subquery to access data (e.g., sampled data) in the database. However, if the tree is traversed and the domains are incompatible, then process 900 blocks 970 the query/subquery from accessing the requested data in the database.

Further details of one example of domain tree traversal are described with reference to FIG. 10. In one example, a traversal process (e.g., a traversal process 1000) is implemented using one or more of the sub-modules (e.g., sub-module 550) of sampled database access control module 150 and is executed by a computing device (e.g., computer (e.g., computer 101, other computer, etc.), a server (e.g., server 104, other server, etc.), an end user device (e.g., end user device 103), a processor, node and/or processing circuitry, etc. (e.g., of processor set 110 or other processor sets), and/or one or more other computing devices, etc.). Although example devices, computers, servers, end user devices, processors, nodes, processing circuitry and/or computing devices are provided, additional, fewer and/or other computers, servers, end user devices, processors, nodes, processing circuitry and/or computing devices may be used for the traversal process and/or other processing. Various options are possible.

Figure 10:
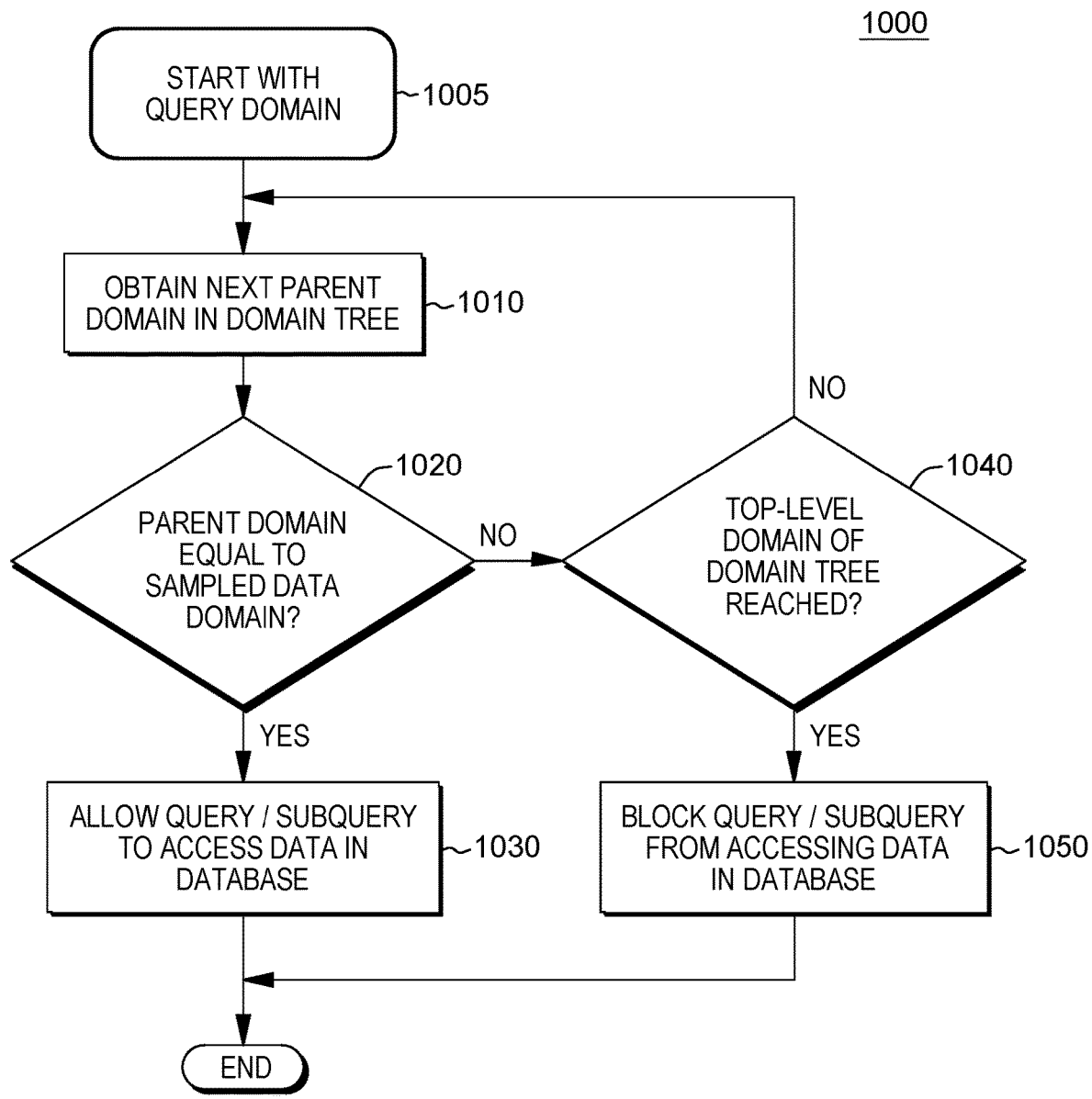
FIG. 10 depicts one example of traversing a domain tree, in accordance with one or more aspects of the present disclosure.

In one example, referring to FIG. 10, traversal process 1000 (also referred to as process 1000) begins 1005 the traversal with the domain of the query (or application or subquery depending on, e.g., which is requesting). From a node of the tree representing the domain of the query/subquery/application, process 1000 obtains 1010 a next parent domain upstream in the domain tree and determines 1020 whether the parent domain is equal to the domain of the sampled data. If the domains are equal, in one example, process 1000 allows 1030 the query/subquery (and/or application) to access the data (e.g., sampled data) in the database. For instance, the query is performed and/or a signal or indication is provided that the query may be performed. In other examples, predetermined relationships other than equal may be used.

However, if the domains are unequal, process 1000 determines 1040 if the top level domain of the tree has been reached. If the top level domain has not been reached, process 1000 continues with obtaining 1010 the next parent upstream. However, if the top level domain of the domain tree has been reached and compatibility has not been found, process 1000 blocks 1050 the query/subquery (and/or application) from accessing data in the database. For instance, the query is not performed and/or a signal or indication is provided that the query is not authorized to access the data.

In one or more aspects, a capability is provided to facilitate processing associated with sampled data, including query access to sampled data. In one or more aspects, access management and data organization in different types of database systems is provided when working with sampled data. One or more aspects may be used in, for instance, products that combine and merge the processing of frequently changing data (such as, e.g., Internet of Things data, or other data with frequent but marginal information changes) with, e.g., enterprise data.

One or more aspects of the present disclosure are tied to computer technology and facilitate processing within a computer, improving performance thereof. For instance, processing within a computing environment is improved by providing a capability to use sampled data, reducing storage costs and latency and increasing performance. Processing within a processor, computer system and/or computing environment is improved.

Other aspects, variations and/or embodiments are possible.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

Yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, other techniques may be used to determine domain compatibility and/or matching. Further, the database management system may be in storage other than persistent storage. Many variations are possible.

Various aspects and embodiments are described herein. Further, many variations are possible without departing from a spirit of aspects of the present disclosure. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product comprising:
   one or more computer readable storage media and program instructions collectively stored on the one or more computer readable storage media, the program instructions collectively stored comprising:
      program instructions to control access to sampled data of a database, the sampled data being a sampling of selected data in which certain selected data is omitted from the sampled data, and wherein the program instructions to control access to the sampled data include:
      program instructions to obtain, via a database management system executing within a computing environment, a request to query the sampled data of the database;
      program instructions to determine, using the database management system and based on the request, whether the sampled data of the database is to be accessed by the query, wherein the program instructions to determine whether the sampled data of the database is to be accessed use domains defined to control access to the sampled data, the domains including a query domain and a data domain, the program instructions to determine whether the sampled data of the database is to be accessed include program instructions to check the query domain defined for the query with the data domain defined for the sampled data, wherein the query domain identifies a selected domain with which the query belongs and the data domain identifies a chosen domain with which the data belongs; and
      program instructions to access the sampled data, via the query, based on the checking of the query domain and the data domain indicating that the sampled data is to be accessed.

2. The computer program product of claim 1, wherein the program instructions to check the query domain defined for the query with the data domain defined for the sampled data include program instructions to compare the query domain with the data domain and based on the query domain having a predefined relationship with the data domain, the sampled data is to be accessed.

3. The computer program product of claim 2, wherein the predefined relationship comprises equal.

4. The computer program product of claim 2, wherein the query domain and the data domain are represented as nodes in a domain tree and wherein based on the query domain and the data domain not having the predefined relationship, the program instructions to determine whether the sampled data of the database is to be accessed further include program instructions to select a parent domain node of the domain tree and check a parent domain of the parent domain node for a predetermined relationship with the data domain, wherein based on the parent domain of the parent domain node having the predetermined relationship with the data domain, the sampled data is to be accessed.

5. The computer program product of claim 4, wherein the parent domain node selected is upstream from a node of the query domain in the tree.

6. The computer program product of claim 4, wherein the domain tree has a plurality of levels and starts at a root level, and a level lower than the root level is defined to accept a number of sampling errors greater than the number of sampling errors at the root level.

7. The computer program product of claim 1, wherein the program instructions collectively stored include program instructions to define the data domain.

8. The computer program product of claim 7, wherein a definition of the data domain includes one or more data labels of the sampled data assigned to the data domain.

9. The computer program product of claim 8, wherein the one or more data labels are based on at least one of the following consisting of: latency, freshness, sampling error, field of application, accuracy, precision of the data, sampling model, and sampling technique.

10. The computer program product of claim 1, wherein the sampled data is sampled based on one or more selected domains.

11. A computer system comprising:
a memory; and
at least one device coupled to the memory, wherein the computer system is configured to perform a method, the method comprising:
controlling access to sampled data of a database, the sampled data being a sampling of selected data in which certain selected data is omitted from the sampled data, and wherein the controlling access to the sampled data includes:
obtaining, via a database management system executing within a computing environment, a request to query the sampled data of the database;
determining, using the database management system and based on the request, whether the sampled data of the database is to be accessed by the query, wherein the determining whether the sampled data of the database is to be accessed uses domains defined to control access to the sampled data, the domains including a query domain and a data domain, the determining whether the sampled data of the database is to be accessed includes checking the query domain defined for the query with the data domain defined for the sampled data, wherein the query domain identifies a selected domain with which the query belongs and the data domain identifies a chosen domain with which the data belongs; and
accessing the sampled data, via the query, based on the checking of the query domain and the data domain indicating that the sampled data is to be accessed.

12. The computer system of claim 11, wherein the checking the query domain defined for the query with the data domain defined for the sampled data includes comparing the query domain with the data domain and based on the query domain having a predefined relationship with the data domain, access to the sampled data is to be accessed.

13. The computer system of claim 12, wherein the query domain and the data domain are represented as nodes in a domain tree and wherein based on the query domain and the data domain not having the predefined relationship, the determining whether the sampled data of the database is to be accessed further includes selecting a parent domain node of the domain tree and checking a parent domain of the parent domain node for a predetermined relationship with the data domain, wherein based on the parent domain of the parent domain node having the predetermined relationship with the data domain, the sampled data is to be accessed.

14. The computer system of claim 11, wherein the method further includes defining the data domain, wherein a definition of the data domain includes one or more data labels of the sampled data assigned to the data domain, and wherein the one or more data labels are based on at least one of the following consisting of: latency, freshness, sampling error, field of application, accuracy, precision of the data, sampling model, and sampling technique.

15. The computer system of claim 11, wherein the sampled data is sampled based on one or more selected domains.

16. A computer-implemented method comprising:
controlling access to sampled data of a database, the sampled data being a sampling of selected data in which certain selected data is omitted from the sampled data, and wherein the controlling access to the sampled data includes:
obtaining, via a database management system executing within a computing environment, a request to query the sampled data of the database;
determining, using the database management system and based on the request, whether the sampled data of the database is to be accessed by the query, wherein the determining whether the sampled data of the database is to be accessed uses domains defined to control access to the sampled data, the domains including a query domain and a data domain, the determining whether the sampled data of the database is to be accessed includes checking the query domain defined for the query with the data domain defined for the sampled data, wherein the query domain identifies a selected domain with which the query belongs and the data domain identifies a chosen domain with which the data belongs; and
accessing the sampled data, via the query, based on the checking of the query domain and the data domain indicating that the sampled data is to be accessed.

17. The computer-implemented method of claim 16, wherein the checking the query domain defined for the query with the data domain defined for the sampled data includes comparing the query domain with the data domain and based on the query domain having a predefined relationship with the data domain, the sampled data is to be accessed.

18. The computer-implemented method of claim 17, wherein the query domain and the data domain are represented as nodes in a domain tree and wherein based on the query domain and the data domain not having the predefined relationship, the determining whether the sampled data of the database is to be accessed further includes selecting a parent domain node of the domain tree and checking a parent domain of the parent domain node for a predetermined relationship with the data domain, wherein based on the parent domain of the parent domain node having the predetermined relationship with the data domain, the sampled data is to be accessed.

19. The computer-implemented method of claim 16, further including defining the data domain, wherein a definition of the data domain includes one or more data labels of the sampled data assigned to the data domain, and wherein the one or more data labels are based on at least one of the following consisting of: latency, freshness, sampling error, field of application, accuracy, precision of the data, sampling model, and sampling technique.

20. The computer-implemented method of claim 16, wherein the sampled data is sampled based on one or more selected domains.

* * * * *